United States Patent [19]

Monopoli

[11] Patent Number: 5,036,166

[45] Date of Patent: Jul. 30, 1991

[54] ELECTRIC FENCE LINE

[75] Inventor: Dion V. Monopoli, Nelson, New Zealand

[73] Assignee: Gallagher Electronics Limited, Hamilton, New Zealand

[21] Appl. No.: 448,955

[22] Filed: Dec. 12, 1989

Related U.S. Application Data

[63] Continuation-in-part of Ser. No. 306,276, Feb. 1, 1989, abandoned, which is a continuation of Ser. No. 81,705, Aug. 4, 1987, abandoned.

[30] Foreign Application Priority Data

Aug. 11, 1986 [NZ] New Zealand ........................ 217168

[51] Int. Cl.$^5$ .......................... H01B 5/08; H01B 7/00; A01K 3/00

[52] U.S. Cl. .............................. 174/128.1; 174/117 F; 174/117 M; 174/129 R; 256/10

[58] Field of Search ............ 174/117 F, 117 M, 128.1, 174/129 R, 130; 57/236, 237, 238, 901; 87/5, 8; 139/425 R; 256/10, 45

[56] References Cited

U.S. PATENT DOCUMENTS

| | | | |
|---|---|---|---|
| 1,897,224 | 2/1933 | Andrews | 57/237 |
| 2,075,996 | 4/1937 | Noyes | 174/128.1 |
| 2,778,870 | 1/1957 | Nolan | 174/128.1 |
| 3,067,569 | 12/1962 | Kelley, Jr. | 174/128.1 X |
| 3,261,908 | 7/1966 | Roche et al. | 124/130 |
| 3,291,897 | 12/1966 | Bramley | 174/128.1 X |
| 3,683,103 | 8/1972 | Mancino | 174/126.2 X |
| 4,150,249 | 4/1979 | Pedersen | 174/36 |
| 4,349,694 | 9/1982 | Vives | 174/128.1 |
| 4,494,733 | 1/1985 | Olsson | 174/117 M X |
| 4,527,135 | 7/1985 | Piper | 174/117 M X |
| 4,684,762 | 8/1987 | Gladfelter | 174/117 M X |
| 4,728,080 | 3/1988 | Kurschner et al. | 174/126.2 X |
| 4,819,914 | 4/1989 | Moore | 174/128.1 X |

FOREIGN PATENT DOCUMENTS

| | | | |
|---|---|---|---|
| 388002 | 12/1910 | France | 174/128.1 |
| 344194 | 3/1931 | United Kingdom | 174/128.1 |

*Primary Examiner*—Morris H. Nimmo
*Attorney, Agent, or Firm*—Abelman Frayne Rezac & Schwab

[57] ABSTRACT

An electric fence line for use in confining livestock is formed of strands of a high strength and high visibility electrically insulative material, which have been woven, twisted, or braided, together with at least one highly electrically conductive low electrical resistance metal strand, such as copper wire, and at least one high-strength metal strand of higher electrical resistance, such as stainless steel. The metal strands are oriented in touching relation, either continuously or at positions spaced longitudinally of the metal strands, the high-strength metal strand providing an electrical bridge between ends of the highly electrically conductive strand or strands in the event of breakage of the highly electrically conductive strand, whereby to provide electrical continuity in the fence line with only a minimal increase in the total electrical resistance of the fence line.

19 Claims, 4 Drawing Sheets

FIG. 4
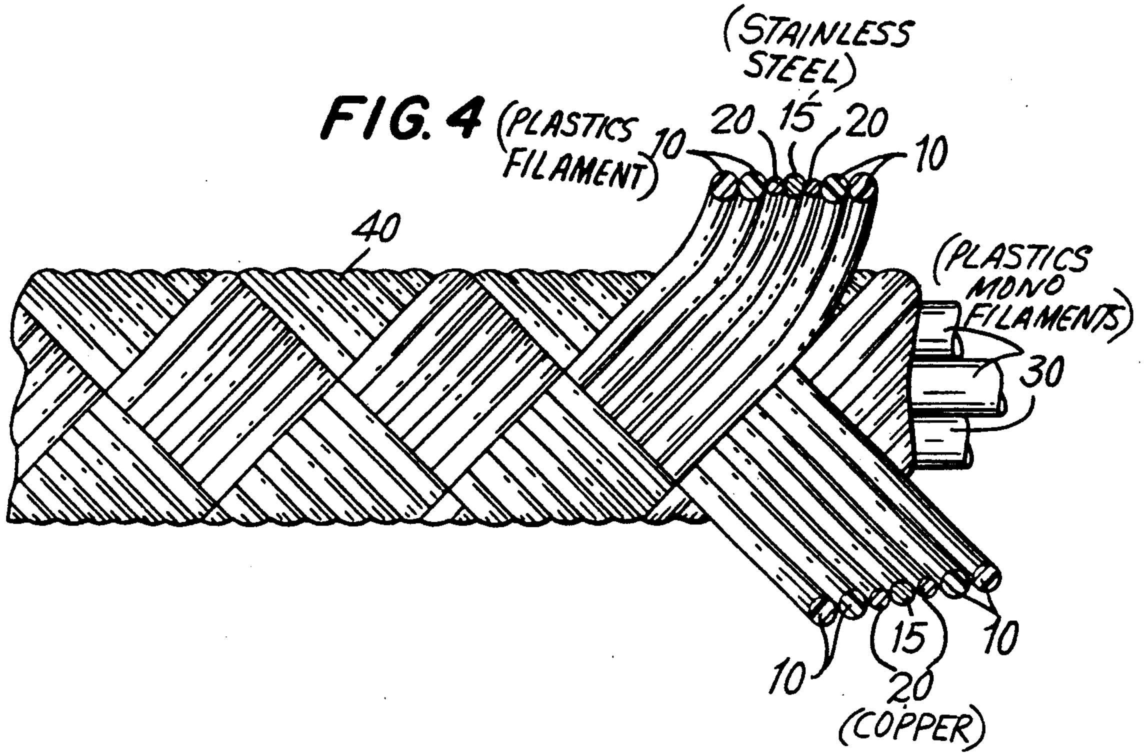
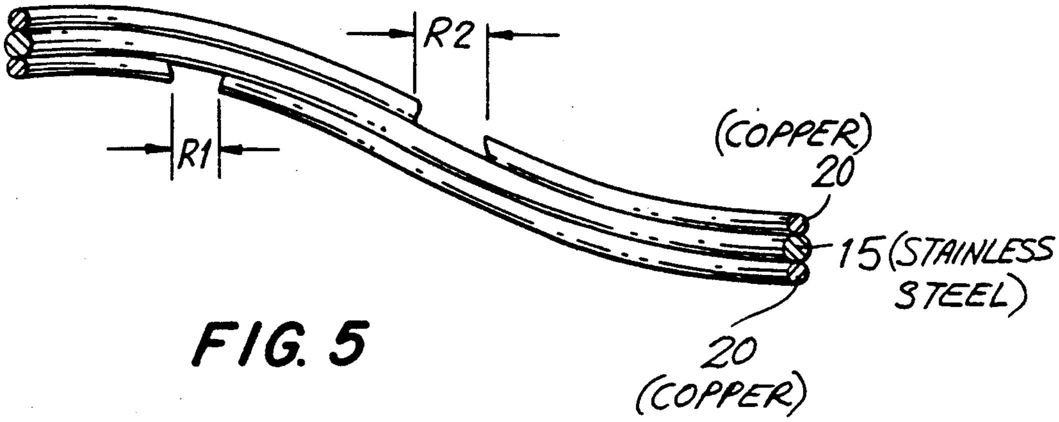
FIG. 5

ELECTRIC FENCE LINE

This application is a continuation-in-part of U.S. patent application Ser. No. 07/306,276 filed Feb. 1, 1989, now abandoned, which is a continuation of U.S. patent application Ser. No. 07/081,705, filed Aug. 4, 1987, now abandoned.

FIELD OF THE INVENTION

This invention relates to electrically conductive fence line, which may be in the form of a woven tape, or in the form of a rope or string, or in the form of a plaited braid, or, in the form of a woven covering enclosing axially aligned monofilaments.

Such electric fence lines commonly are employed for confining livestock on grazing land, and for excluding marauding animals from wheat or corn fields, plantations and the like.

Such electric fence lines are connected at one of their ends to a high-voltage electrical energizer, the electric fence lines themselves extending many hundreds of feet from the high-voltage energizer. As a consequence, such electric fence lines must have a relatively low internal electrical resistance. In addition, they must possess considerable mechanical strength for them to accommodate the tensile forces exerted on the fence line as it is strung around a property on insulated poles. Further, such electric fence lines must be of sufficient strength to absorb the tensile forces exerted on the line in the event that an animal runs into the line.

Electric fence wire constructions carry an electric charge which shocks animals upon contact with the outer surface of the construction and tends to prevent their crossing the fence. These constructions are strung from fence posts or other convenient attachment points. They may be used as perimeter fencing to enclose animals or to keep out predators. They may also be used to subdivide pastures temporarily to insure that they are grazed uniformly, in which case the electric fence wire construction may be taken down and restrung every few days forcing animals to graze different strips of land in regular rotation.

DESCRIPTION OF THE PRIOR ART

A typical example of such an electric fence line is to be found in Bramley U.S. Pat. No. 3,291,897 issued Dec. 13, 1966. The fence line of that patent is comprised of a twisted rope incorporating strands of an electrically conductive material such as galvanized steel wire or tinned copper wire. A similar construction is disclosed in Andrews U.S. Pat. No. 1,897,224 issued Feb. 14, 1933. A more recent example of such a fence line is to be found in European patent application 83110522.6 filed Oct. 21, 1983.

While each of the constructions disclosed in these prior publications are admirable for their intended purpose, they each are encumbered with the major disadvantage that they employ relatively fragile electrical conductors of low tensile strength, and, ones which are prone to work-hardening and consequential breakage. This occurs particularly at points along the line where the line has been knotted or twisted, or is subjected to abrasion, or is subjected to tensional forces in the line.

If a single conductor is incorporated into the fence line, than, on breakage of that conductor the entire fence line downstream of the breakage becomes electrically disconnected from the high voltage energizer. On the other hand, if more than one electrical conductor is incorporated into the fence line, the breakage of one or more of the conductors will result in an increase in the electrical resistance of the fence line downstream of the breakage, with a consequence that the voltage available in the electric fence line downstream of the breakage is of insufficient magnitude to repel an animal.

SUMMARY OF THE INVENTION

It is an object of this invention to provide an electric fence line which has the capability of maintaining low electrical resistance throughout its length, despite the breakage of one or more highly electrically conductive strands incorporated into the fence line.

This is accomplished according to the present invention by loosely incorporating the highly electrically conductive strands into the fence line, and by incorporating an additional electrically conductive strand of high strength into the fence line in touching relation with the highly electrically conductive strands, either continuously, or at positions spaced longitudinally of the highly electrically conductive strands.

The additional strand is formed from a material which is highly resistive to work-hardening and fatigue fracture, and preferably is a thin wire of stainless steel. The additional strand also is loosely incorporated into the fence line.

The fence line itself is formed from electrically insulative strands of a fiber glass or other plastics material of considerable resistance to elongation under tensile stress, the strands of electrically insulative material themselves providing the required tensile strength of the fence line.

While the additional conductor comprised of stainless steel wire itself has considerable tensile strength, it is not called upon in a capacity to provide additional tensile strength in the fence line. Instead, it is called upon to be resistive to breakage of the additional conductor arising from bending, knotting, or abrasion of the fence line.

The essential requirement of the additional strand is that, despite its higher electrical resistance, it will maintain electrical continuity throughout the entire length of the line in the event of breakage of the highly electrically strands.

Metals of low electrical resistance, such as copper and its alloys and aluminum, have the unfortunate characteristics of being relatively weak under tensile loading, and also, very susceptible to fatigue fracture or work hardening, which can arise as a consequence of bending or knotting of the fence line. Additionally, such metals have poor resistance to abrasion, which is another major cause of breakage of the highly electrically conductive strands of low electrical resistance.

By the incorporation of the additional high-strength metal strand into the electric fence line, and in touching relation with the highly electrically conductive strands of low electrical resistance, if a highly conductive strand breaks, then, the high-strength metal strand provides an electrical bridge between the broken ends of the highly conductive strand.

Breakage of a highly conductive metal strand will result in an increase in the electrical resistance of the fence line, but, to an extent that has no significance. Instead of inserting into the fence line the entire electrical resistance of the high-strength metal strand, (which will have a much higher resistance than that of the highly electrically conductive strand), only a minor length of the high-strength metal strand required to bridge the break in the highly electrically conductive strand is inserted into the electrical circuit.

If more than one highly electrically conductive strand is employed in the construction of the fence line, then, the break will be bridged not only by the additional high-strength metal strand, but also by the additional highly conductive strands. This will decrease any increase in total electrical resistance of the fence line to such an extent that virtually no increase in electrical resistance of the fence line results as a consequence of breakage of one of the highly electrically conductive strands.

If a break occurs in both of the highly electrically conductive strands at the same point, then, a minor increase in electrical resistance of the fence wire will result as a consequence of the short length of high-strength strand inserted into the electrical circuit. However, invariably only a very short length of the high-strength metal strand will be inserted into the circuit, that short length itself being of very low electrical resistance.

As a consequence of this built-in safeguard against electrical discontinuity in the fence line, both the highly conductive strand or strands and the high-strength metal strand can be of minimal gauge, thus preserving the flexibility and handling of the fence line without substantially increasing the weight of the fence line.

A further advantage arising from the invention is that, as the electrically conductive strands occupy a minor surface area of the fence line, the fence line itself can be made of a highly visible plastics material by incorporation of brightly colored or fluorescent pigments into the plastics material.

Three major problems arise in the construction of electric fence lines, each of which is overcome by the present invention.

Firstly, breakage of the electrically conductive conductors will occur due to frequent reeling in of the fence line, or rearrangement during strip grazing, or by overtensioning during installation, or by knot tying and wind flutter. Breaks in those conductors are not readily detectible, and will continue until the fence line ceases to conduct. The present invention eliminates this problem by the provison of the high strength metal strand to provide electrical continuity between the ends of the broken conductors.

Secondly, the length of fence line which can be electrified to a correct voltage potential, even with the provision for six conductor strands is approximately 1,500 meters. However, this presupposes that all of the conductor strands remain unbroken. Breaks in those strands will increase the electrical resistance of the fence line, requiring an increased voltage potential, and shortening the length of fence line that can be optimally energised. The present invention eliminates this problem by providing an electrical bridge of high strength metal between the broken ends, to maintain the electrical resistance of the fence line substantially constant.

Thirdly, the fence lines is not sufficiently visible under all conditions to make a satisfactory boundary. Fog, rain, dust and darkness all reduce the visibility of the fence line under field conditions. In addition, the behavior of animals confined by the line is also a consideration. Animals such as horses may be moving at speed within a fenced enclosure. A herd of animals such as cows, may push others of the hard towards the line. For these reasons, manufactures usually seek to improve the visibility of the line by imparting colors to the line which they believe will maximize visibility.

Orange, yellow, yellow and black stripe are all available for selection of those colors for establishing contrast with a predominant field color, which can be grass or tree green color and to a lesser extent blue sky color. The choice of the available tape colors appears to have been suggested by the selection of high visibility colors already successful in city states where visibility in low intensity light is the guiding factor.

By the present invention enhanced visibility of the fence line is obtained, in that the conductors are of minimal size and number, and do not obscure the bright coloring of their supporting strands to any significant extent.

DESCRIPTION OF THE DRAWINGS

The invention will now be described with reference to the accompanying drawings which illustrate the preferred embodiments of the invention, and in which:

FIG. 4 is illustrative of an electric fence line having a plaited covering; and, FIG. 5 is a diagrammatic illustration of the bridging capability of the high-strength metal strand in the event of breakage of one or more of the highly electrically conductive strands.

DESCRIPTION OF THE PREFERRED EMBODIMENTS

Figure 1:
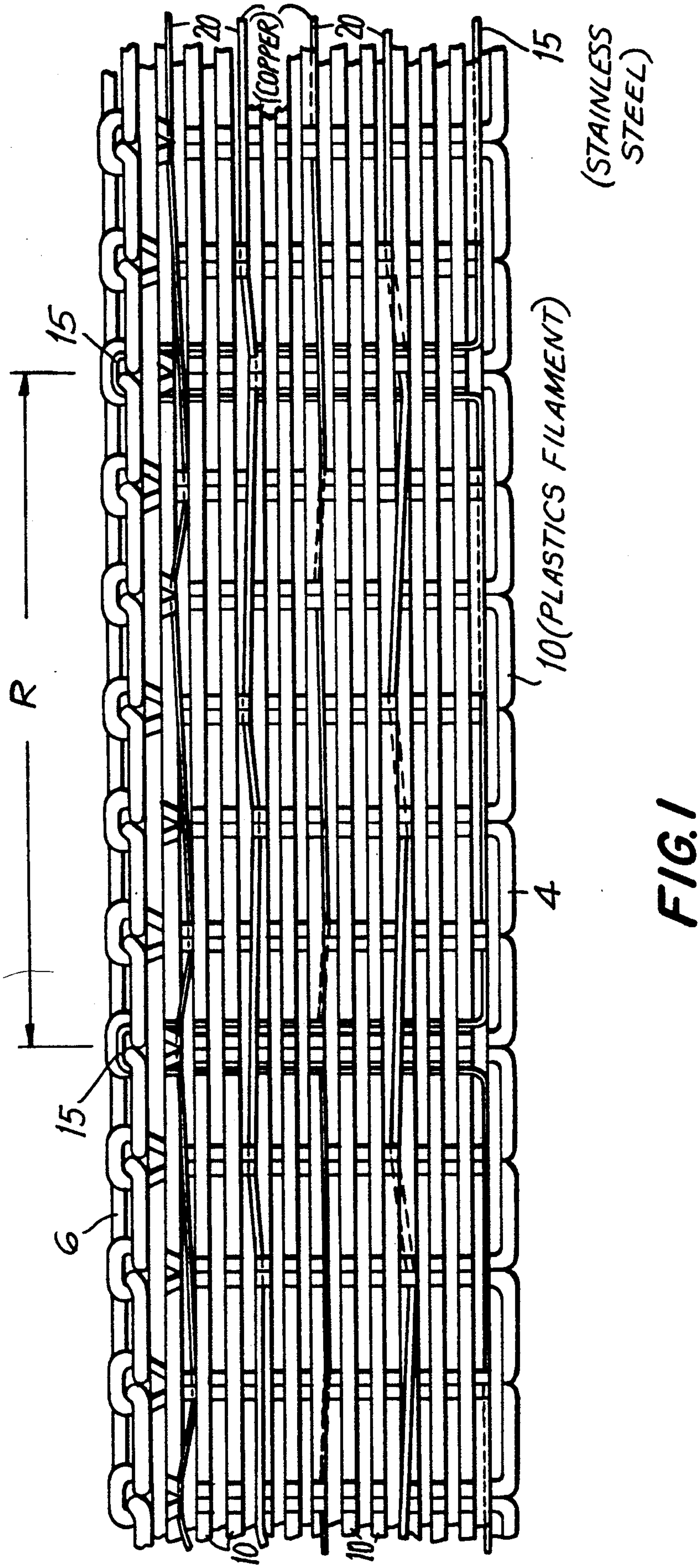
FIG. 1 is illustrative of an electric fence line in the form of a tape.

Throughout the following description of the accompanying drawings, the same reference numerals have been employed to identify structural members common to each of the preferred embodiments.

Structural members formed from a high-strength electrically insulative material have been indicated at 10. High-strength metal strands have been indicated at 15. Strands of high electrical conductivity have been indicated at 20.

Referring now to FIG. 1 a tape form of electric fence line is illustrated, the tape being woven from strands 10 of a suitable electrically insulative material, the weaving being of conventional form and providing a selvedge 4,6 at each edge of the tape.

The strands 10 may be of fiberglass or any suitable plastics material, such as a polyolefin of which typical examples are polyethylene, or polypropylene or a polyester such as that known under the Trademark "Terylene", polyamides such as nylon, and, cellulosic materials such as rayon which preferably has been treated to render it hydrophobic. Such materials posses considerable tensile strength, and can be made highly relative to elongation under tensile loading by orientation of the plastics material.

Interwoven with the strands 10 of the tape is a strand 15 of a high-strength metal, typically, stainless steel wire. The strand 15 is loosely woven into the strands 10, and at intervals is traversed laterally of the tape for it to extend across the entire width of the tape. This weaving technique is well known in the art, and forms no part of this invention.

Typically, the strands 10 will be monofilaments of 1.00 Denier, and, the stainless steel wire 15 will be 0.15 millimeters in diameter.

Also, woven loosely into the tape are four strands 20 of a highly electrically conductive material of low electrical resistance, typically copper, tinned copper or aluminum.

Typically, the strands 20 will be strands of 0.25 millimeters in diameter.

Further, typically, the strands 10 will be woven on a ribbon weaving machine into a ribbon 12 millimeters wide using a weft 4 of the same material which engages a lock strand 6. The weave is simple over-under, all of the filaments containing 3% by weight of titanium dioxide giving a white corresponding to British standard 9/102. A small mixture of brilliance enhancer is also incorporated. The tape when woven is stiff enough to resist curling across its width, and is sufficiently tightly woven for it to maintain a substantially flat ribbon form when relieved from all tension. The tape is to be dispensed from a reel and mounted on fence posts using insulators in a known manner.

It is emphasized that the strands 15 and 20 are loosely woven into the tape, and thus, do not contribute to the tensile strength of the tape, the tensile strength being provided by the strands 10 alone.

As illustrated in FIG. 1, the stainless steel strand 15 extends across the width of the tape at each 7th pick, and in so doing provides bridging contact with the copper strands 20. Thus, the copper strands are bridged at regular intervals throughout the length of the tape.

If now one of the copper strands 20 is broken, the remaining unbroken copper strands 20 will provide electrical continuity in the tape. Additionally, the ends of the broken copper strands 20 will be bridged by the stainless steel strand 15, thus decreasing an expected increase in electrical resistance of the tape due to breakage of that copper wire 20.

There is, of course, the possibility that all of the copper strands 20 will be broken at points intermediate a lateral traverse of the stainless steel strand 15. If that happens, then, the broken ends of each of the broken strands 20 will be bridged by the stainless steel strand 15. If this should happen, only a very minor length of stainless steel strand 15 is inserted into the electrical circuit in order to provide electrical continuity. The length of stainless steel strand 15 so inserted will increase the electrical resistance of the electric fence line, but, only by an insignificant amount. In fact, many such total breaks of the copper strands 20 can occur in the same location without impairing the operativeness of the electric fence line by raising its electrical resistance to an unacceptable extent.

As the stainless steel strand 15 and the copper strands 20 are loosely woven into the tape, the tape is still capable of minor elongation under tensile stress without in any way imposing significant tensile stresses either on the stainless steel strand 15, or, on the copper strands 20. Thus, elongation of the tape under tensile stresses will not result in breakage of the relatively weak copper strands 20 or of the relatively stronger stainless steel strand 15, neither of which is called upon to enhance the tensile strength of the tape.

Figure 2:
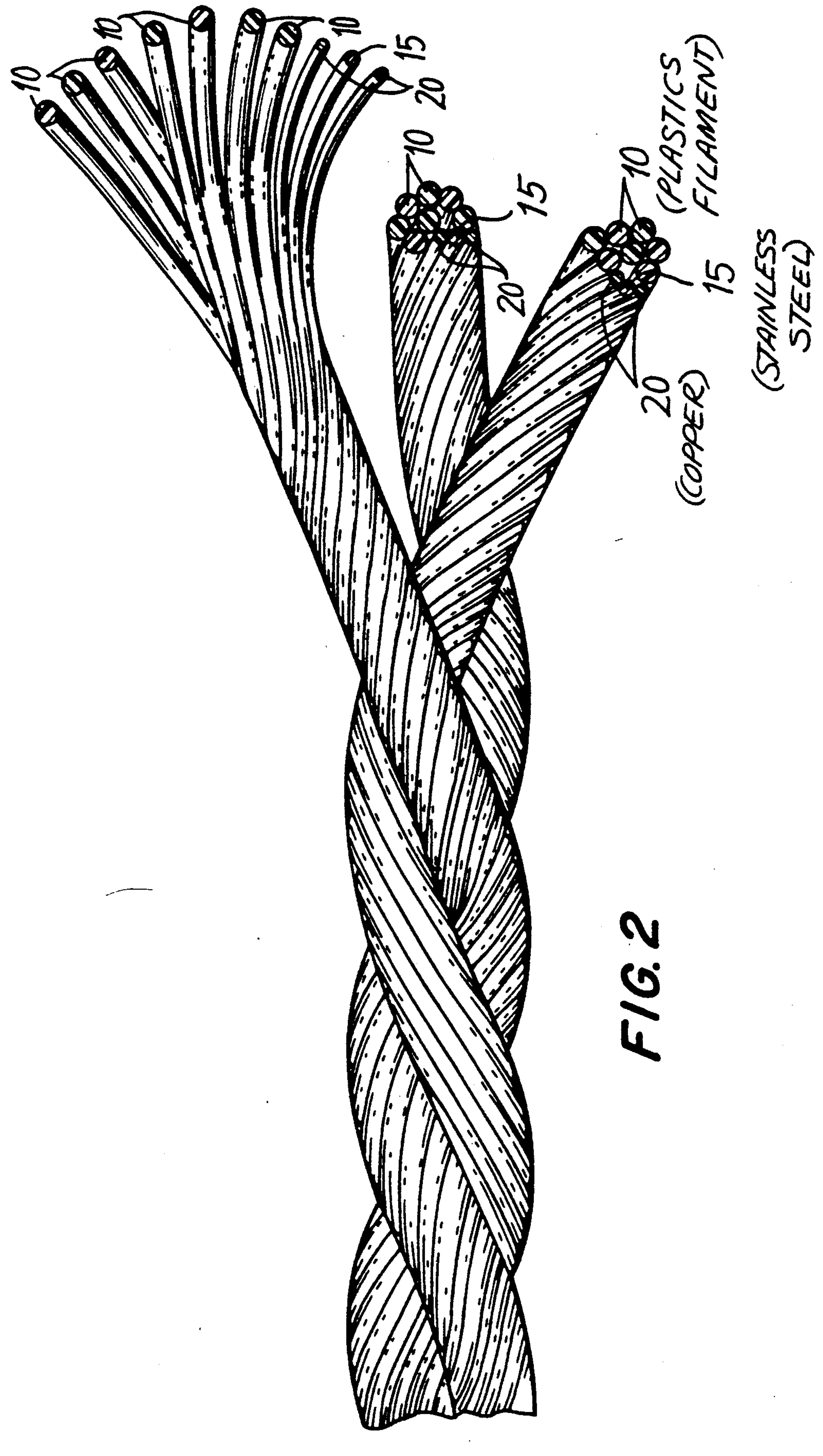
FIG. 2 is illustrative of a fence line in the form of a twisted rope or string.

Referring now to FIG. 2, a fence line is illustrated comprised of three strand groups each incorporating seven strands 10 of plastics material, a single strand 15 of stainless steel and two strands 20 of tinned copper. The strands 15 and 20 are loosely twisted into the associated strand group, to again produce the same results as in FIG. 1.

As will be appreciated, a single one of the three strand groups could be used alone to provide a light weight fence line.

The strands 10 provide the required tensile strength of each of the strings of the rope, the strands 20 provide the high electrical conductivity in each of the strings, while the strand 15 of stainless steel wire functions in its ability to resist breakage, and, at the same time to provide electrical continuity in the fence line in the event of breakage of one or both of the highly electrically conductive strands 20. By virtue of the strands 15 and 20 having been loosely twisted into the strands 10, the strands 10 are capable of limited amount of elongation without imposing tensile stresses on the strands 15 and 20, the stainless steel strand 15 being provided for electrical continuity only and in no way serving to enhance the tensile strength of the rope.

Figure 3:
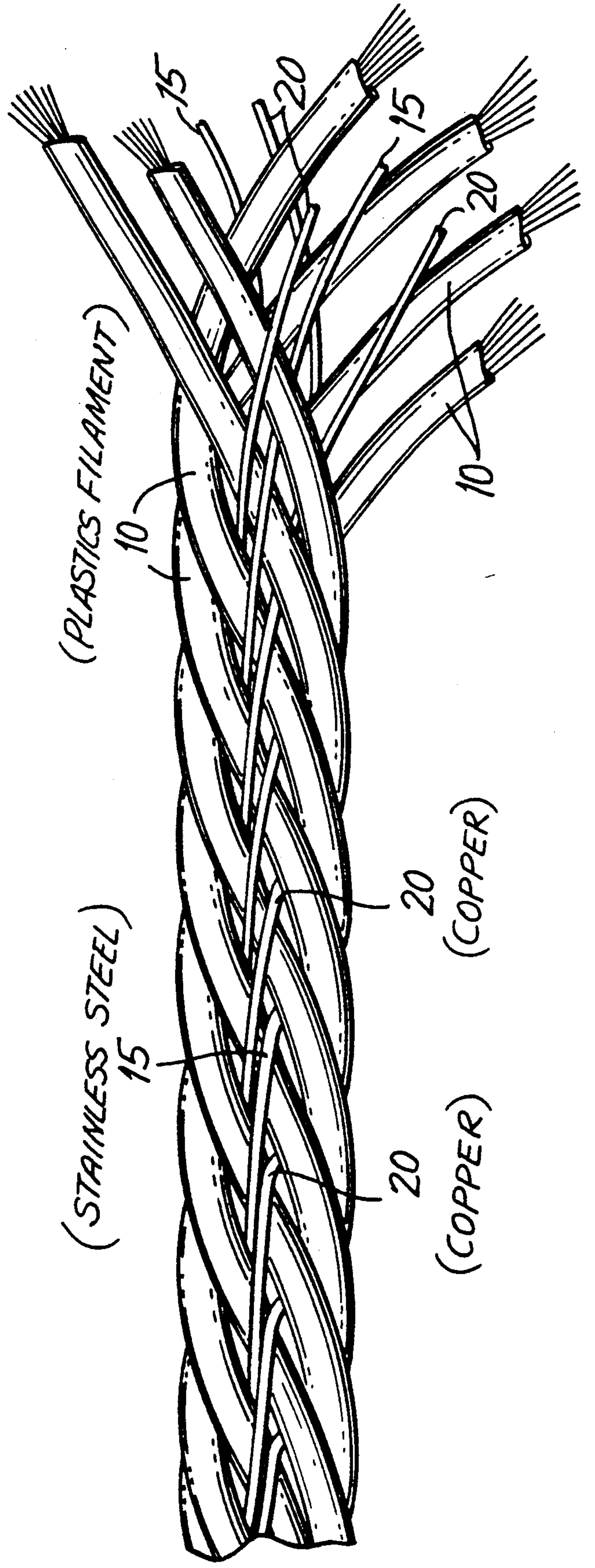
FIG. 3 is illustrative of an electric fence line in the form of a plaited braid.

FIG. 3 shows an alternative embodiment which has been braided instead of twisted, the strands 15 and 20, as in FIG. 2, being in a relaxed condition.

Referring now to FIG. 4, a construction of fence line having a covering is illustrated, the fence line incorporating a central core comprising a bunch of plastics monofilaments which are encased in a plaited sheath 40. The braiding 40 is loosely applied about the core monofilaments 30, and does not contribute to the tensile strength of the fence line. At least one set of the woven braids is comprised of a group of monofilaments 10 of plastics material, a central strand 15 of stainless steel wire, and two adjacent strands 20 of copper wire. Each of the plaited braids can be of the same construction such that each plaited braid is in electrical contact with the adjacent overlying or underlying braid, thus further enhancing electrical continuity in the fence line in the event of breakage of one or more of the copper wires 20.

Referring now to FIG. 5, this FIG. diagrammatically illustrate how it is that breakage of any one of the copper wires 20 will result in only a minor increase in the electrical resistance of the electric fence line.

If, for example, a break R1 occurs in the copper wire 20, it will be seen that the short length of that break is bridged not only by the stainless steel wire 15, but also, by an unbroken length of the adjacent copper wire 20.

If a break R2 occurs at a different location then, an unbroken length of copper wire 20 and the stainless steel wire 15 bridge that break, again, with only minor consequences in an increase in total electrical resistance of the fence line.

If the breaks R1 and R2 should occur at the same location, then, the stainless steel wire alone will provide electrical bridging of the broken ends at that location. The length of stainless steel wire that is inserted into the circuit is, however, of minor length, and as such imposes an inconsequential increase in electrical resistance of the fence line, electrical continuity being preserved throughout the length of the fence line.

As will be appreciated, the preferred embodiments are to be considered as being illustrative only of the present invention. Various modifications in those embodiments can be made by increasing or decreasing the number of monofilaments of plastics material, by increasing the number of highly electrically conductive strands 20 or reducing them to one, by adding further stainless steel strands 15, and, by resorting to any form of weaving, twisting and braiding that will result the highly electrically conductive strands 20 and the high strength metal strand 15 either being in touching relation throughout their lengths, or, being in contact with each other at longitudinally spaced positions, the respective strands 15 and 20 being loosely incorporated into the strands of plastics material, the strands of plastics material 10 or 30 being the sole members of the construction that are required to absorb tensile forces.

Electric fence wire construction of this invention is resistant to stretching, and particularly the supporting fibers are resistant to stretching, so that the conductor and the supporting fibers in tests break at substantially the same time, which makes broken conductors easy to locate. The wire construction of this invention has also been found in testing to knot well, and to resist stress fracture, abrasion, and flames. The conductor is sufficiently malleable to perform well in splicing.

I claim:

1. An electric fence line, comprised of:

strands of dimensionally stable electrically insulative material assembled into a structurally stable form providing a fence line;

at least one continuous strand of a highly conductive metal of low electrical resistance, and, at least one continuous strand of a high-strength metal, said highly conductive strand and said high-strength strand being incorporated into said stable form providing said fence line in a relaxed condition substantially free from tensile stress;

said highly conductive strand and said high-strength strand being arranged in touching relation at least at positions spaced longitudinally of said highly conductive strand and said high strength strand;

whereby, said high-strength strand will provide electrical bridging between broken ends of said highly conductive strand in the event of breakage of said highly conductive strand, to maintain electrical continuity throughout said highly conductive strand in the substantial absence of an increase in the electrical resistance of said highly conductive strand.

2. The fence line of claim 1, in which said strands of electrically insulative material are strands of fiber glass.

3. The electric fence line of claim 1, in which said strands of electrically insulative material are monofilaments of plastics material that are resilient to elongation under tensile stress.

4. The electric fence line of claim 1, in which said strand of highly conductive metal of low electrical resistance is a strand selected from the group of copper, tinned copper, and aluminum wire.

5. The electric fence line of claim 1, in which said strand of high-strength metal is a stainless steel wire.

6. The electric fence line of claim 1, in which said stable form providing a fence line is comprised of a tape woven from said strands of electrically insulative material, said strands of highly conductive metal of low electrical resistance extending longitudinally of said tape and being loosely interwoven with said tape, said strand of high-strength metal also being loosely interwoven with said tape, said strand of high-strength metal extending longitudinally of said tape, and also extending transversely of said tape across the width thereof at positions spaced longitudinally of said tape to provide interconnections with each of said highly conductive metal strands of low electrical resistance and provide bridging of broken ends of said highly conductive metal strands in the event of breakage of said highly conductive metal strands.

7. The electric fence line of claim 1, in which said stable form providing said fence line is a string twisted from a bundle of said strands of electrically insulative material, said strand of highly conductive metal of low electrical resistance and said strand of high-strength metal being loosely intertwisted with said strands of plastics material.

8. The electric fence line of claim 7, in which said stable form providing said fence line is comprised of at least two said stringe twisted together to provide a fence line of rope form.

9. The electric fence line of claim 7, in which said stable form providing said fence line is a braid provided by plaiting at least three of said strings into intertwisted relations.

10. The electric fence line of claim 1, in which said stable form providing said fence line is comprised of a core of strands of said electrically insulative material, and a covering on said core comprised of a plaiting of other strands arranged in groups, at least one of said other groups including strands of electrically insulative material, and at least one said highly electrically conductive strand of low electrical resistance and at least one said strand of high-strength metal positioned in touching relation with said highly conductive strand.

11. The electric fence line of claim 10, in which each group of strands comprising said plaited covering is comprised of a group including strands of electrically insulative material and at least one strand of said highly conductive material of low electrical resistance positioned in touching relation with at least one said high strength metal strand, the respective conductive strands of said respective groups being interconnected one with the other by virtue of their overlying relation.

12. An electric fence line comprising a flexible and substantially stretch resistant support member at least two spaced conductive filaments spaced apart but in close proximity each of the said at least two conductive filaments having distinct mechanical and electrical qualities with a first of the filaments having superior electrical conductivity while a second of the filaments has superior resistance to fatigue, the arrangement and construction being such that in use in the event of breakage of said first filament the probability is that the second filament will remain unbroken with current bridging occurring between the broken and unbroken filament minimizing conductivity losses.

13. An electric fence line as claimed in claim 12 wherein the support member is a tape.

14. An electric fence line as claimed in claim 12 wherein the support member is a strand.

15. An electric fence line as claimed in claim 12 wherein the support member comprises a plurality of strands braided together.

16. An electric fence line as claimed in claim 12 wherein the support member is constructed from non-metallic plastics filaments.

17. An electric fence line as claimed in claim 16 wherein the non-metallic plastics filaments contain a white filler.

18. An electric fence line as claimed in claim 12, wherein in the first conductive filament is copper and the second filament is stainless steel.

19. An electric fence line as claimed in claim 12, wherein the first conductive filament is aluminum and the second filament is stainless steel.

* * * * *